Jan. 4, 1955 H. O. ANGER 2,698,900

DELAY LINE PULSE GENERATOR

Filed Jan. 7, 1946 2 Sheets-Sheet 1

INVENTOR
HAL O. ANGER

BY M. O. Hayes

ATTORNEY

INVENTOR
HAL O. ANGER

BY M. O. Hayes

ATTORNEY

United States Patent Office 2,698,900

Patented Jan. 4, 1955

2,698,900

DELAY LINE PULSE GENERATOR

Hal O. Anger, Long Beach, Calif., assignor to the United States of America as represented by the Secretary of the Navy Application January 7, 1946, Serial No. 639,676

7 Claims. (Cl. 250—27)

This invention relates to electrical circuits for producing high voltage high current pulses of very short duration having substantially constant amplitude during the pulse. Such circuits are commonly called pulse generators, or modulator circuits, and are used to produce square topped pulses of short duration needed for application to magnetrons in radar equipment.

The pulse generator to be described here is a system for converting power in the form of high voltage direct current or alternating current into short pulses of high current and voltage, and employs an open ended transmission line, a quick acting switch such as a gas filled electron tube or a spark gap, a choke for reversing the potential on the line and a high voltage condenser. A second electron tube called the potential reversing tube is used in one embodiment for the purpose of reversing the potential of the open ended transmission line. The pulses are developed across a suitable load, whose impedance and the impedance of the open-ended transmission line must be equal to each other.

Artificial transmission lines or delay lines, so called, composed of numerous capacitors in parallel connection through inductors have been used previously to store up large amounts of energy and to release it in the form of a pulse of energy having relatively constant amplitude during the period of discharge, which period may be varied by choice of characteristics of the artificial line. Such lines then can produce the type of pulse sought.

One disadvantage of such circuits previously has been that the discharge of such a line must be through a load having an impedance equal substantially to that of the line, with the output being taken across this load impedance. As a consequence, the output voltage obtainable has approximated only about half of the supply potential used to charge the line.

It is the object of this invention to make possible a short square-topped output pulse whose voltage will approximate the full amount of the line charging potential. Another object is to construct a delay line pulse generator having a choke inductor across it to reversibly charge the line between pulses to amplitudes equal to and polarity opposite to the charging potential, so that these values become additive during the discharge process which is productive of the pulse. There is thus made available twice the charging potential around the discharge circuit, and the one half of this occurring across the load produces a pulse of amplitude substantially equal to the line charging potential.

Other objects, features and advantages will appear in the following detailed description taken together with the drawings.

Figure 1:
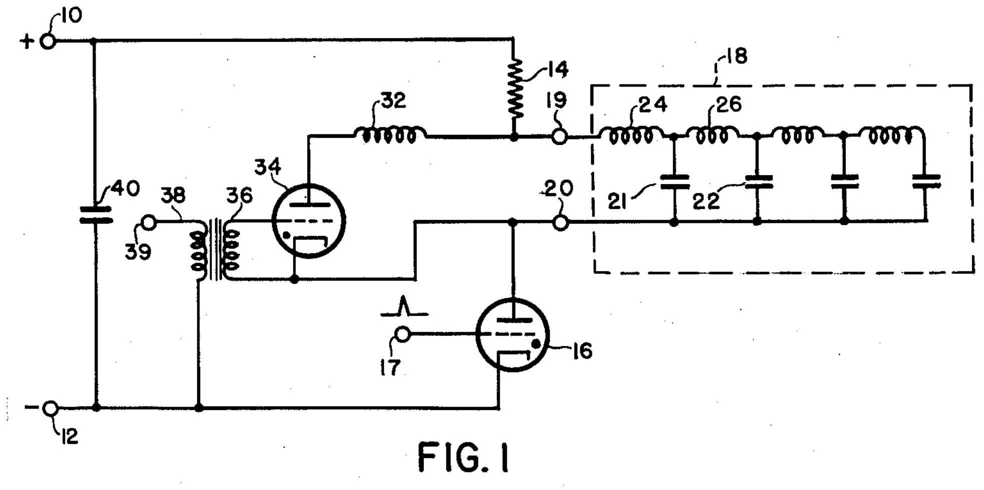
Fig. 1 is a circuit diagram of one embodiment using a potential reversing choke and tube.

Referring now to Fig. 1, there is shown the diagram of a circuit embodying the principles of this invention. A direct current high voltage supply is assumed to be available at input terminals 10 positive and 12 negative. This D. C. supply potential is connected through a load resistor 14 and a thyratron switch tube 16 respectively to the sides of an open ended artificial transmission line 18 composed of a number of capacitors (such as 21, 22, etc.) respectively connected in parallel through inductors (such as 24, 26, etc.). Terminals of the line are indicated by 19 and 20.

The series switch thyratron tube 16 is adapted to respond to positive trigger pulses impressed on its grid via terminal 17.

The remainder of the circuit consists of a choke inductor 32 connected in parallel across the line 18 through a second switch tube 34 which is also responsive to positive triggers supplied to its grid from the secondary 36 of a transformer when triggers are impressed on the transformer primary 38 via terminal 39.

A high voltage capacitor 40 is connected between input terminals 10 and 12.

The quick-acting switch is represented by tube 16, the potential reversing choke by inductor 32, the potential reversing tube by 34, and the load by 14. The method of operation of the system is as follows: Assume the potential between terminals 10 and 12 is equal to E. Also, assume that the open-ended transmission line is charged to a potential of E and that the polarity is such that terminal 20 is positive with respect to terminal 19. Then the potential between terminals 12 and 20 will be equal to 2E. Now, if a trigger voltage is applied to terminal 17, terminals 12 and 20 are effectively shorted by tube 16. Current will then flow in the series circuit composed of condenser 40, load 14, the open-ended transmission line 18 and tube 16. The current will flow until the open-ended transmission line 18 has charged to a potential equal to E, and the polarity will be opposite to the postulated original charge. The potential between terminals 10 and 12 is then just balanced by the potential between terminals 19 and 20. Therefore, current no longer flows through 14 and the pulse of current has been terminated. Tube 16 now de-ionizes and becomes non-conducting.

A second trigger voltage is now applied to terminal 39. Tube 34 forms a conducting path for the circuit composed of tube 34, choke 32 and the open-ended transmission line 18. The charge on the open-ended transmission line flows through choke 32 and tube 34 until the transmission line 18 is charged to a polarity approximately equal and opposite to the former charge. The charge cannot now flow back through choke 32, since tube 34 will not conduct in the opposite direction. The potential between terminals 12 and 20 is now approximately equal to 2E again and the circuit is ready to repeat the pulse-forming cycle.

Figure 2:
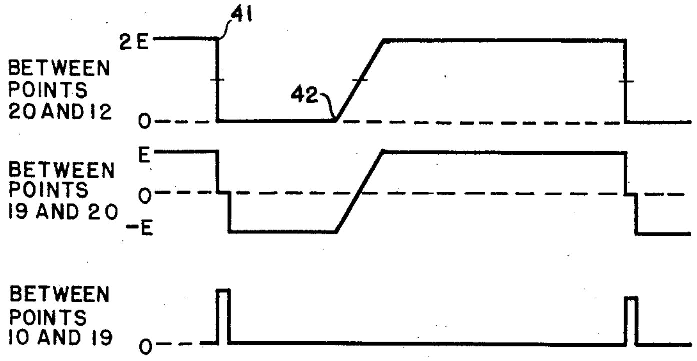
Fig. 2 is a graph showing the cycle of potential at various points in the circuit.

The wave forms of Fig. 2 show how the potential varies at different points in the circuit during the pulse cycle. The trigger to terminal 17 for switch tube 16 is applied at time indicated by 41 while the line potential reversing trigger to terminal 39 is applied at time indicated by 42.

Firing pulses were applied alternately to the grids of the two thyratrons, 16 and 34. When tube 16 was made conducting by the grid pulse, current flowed through the line, the load, and the tube until the line was charged, after which the current would stop abruptly. The flow of current through this circuit resulted in a short pulse of voltage across the load, the length of the pulse being equal to twice the time delay of the line. During the time the pulse was being formed, current did not flow through tube 34, since the grid was kept negative during this time. After tube 16 had de-ionized, the line was recharged to a potential of equal and opposite polarity by applying a pulse to the grid of tube 34. The action which took place then was as follows. The condensers in the line started to discharge through the choke 32, and the tube 34. The presence of the choke caused the current to keep flowing after the potential across the line was zero, until the condensers in the line were charged at a polarity opposite to their former charge. No current flowed through 16 during this recharging process. The potentials were in series additive, so 2E volts appeared at the plate of tube 16.

When tube 16 was made to fire again, the magnitude of the current flowing was given by the expression $$I=\frac{E_{\text{line}}+E_B}{Z_{\text{load}}+Z_{\text{line}}}$$

Flat top pulses of approximately E volts can be obtained with a D. C. input of only E volts.

The system of Fig. 1 can be simplified and improved by substituting an iron core choke for the air core reversing choke 32. The thyratron, 34, and its pulsing circuit are no longer needed. The only provision was that the choke must have an inductance such that the resonant circuit formed by the choke and the condensers of the line have a frequency of oscillation substantially equal to one half the pulse repetition rate. The circuit diagram of this system is shown in Fig. 3.

Figure 3:
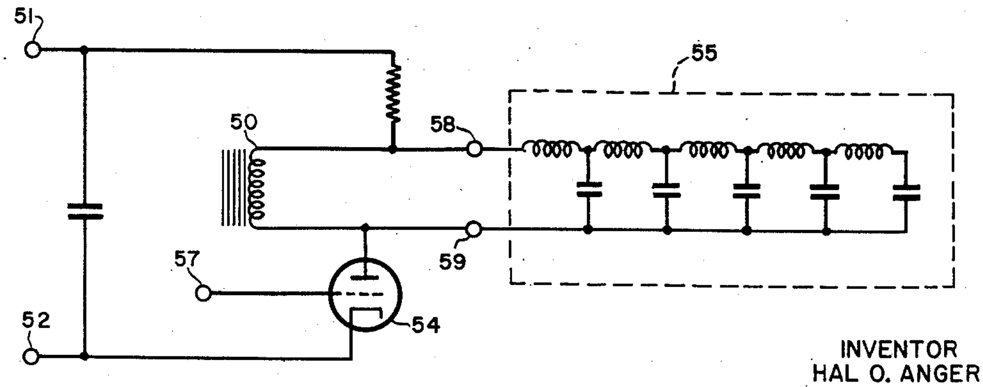
Fig. 3 is a circuit diagram of another embodiment using a larger choke inductor and no tube for the line charge reversing process.

This circuit, shown in Fig. 3, is the same as that of Fig. 1 except that the tube 34 and the small choke 32 have been replaced by a large choke 50. The resonant frequency of the series circuit formed by choke 50 and the open-ended transmission line 55 must be substantially equal to one-half the pulse repetition rate in order for the potential in the transmission line to reverse properly.

The operation of the circuit is then as follows. Assume the potential between terminals 51 and 52 is equal to E as before. Also, assume that the potential across the open-ended transmission line 55 between terminals thereof, 58 and 59 is equal to E and that the total potential across the switch tube 54 is equal to 2E. When a positive trigger voltage is applied to terminal 57, a pulse of current will flow through as described before. At the termination of the pulse, the open-ended transmission line is charged to a potential of E.

Current then begins to flow through the series circuit composed of the choke 50 and the open-ended transmission line 55. The current flows until the transmission line 55 is charged in the opposite direction from formerly, at which time the potential across tube 54 will be equal to 2E. Another trigger voltage should then be applied to terminal 57 and another pulse will be formed.

Good results were obtained with this circuit of Fig. 3 at low voltages, but poor results were obtained at high voltage because the thyratron did not have time to deionize before a positive plate potential began to build up as the line began to recharge through the choke.

Figure 4:
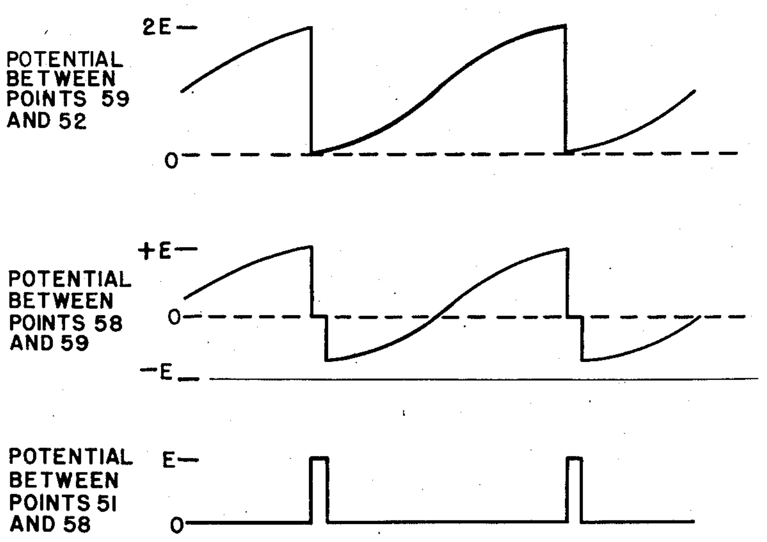
Fig. 4 is a graph showing the potentials at various points in the latter circuit throughout the pulse cycle.

Fig. 4 is a chart showing how the potential varies at different points in this circuit.

Figure 5:
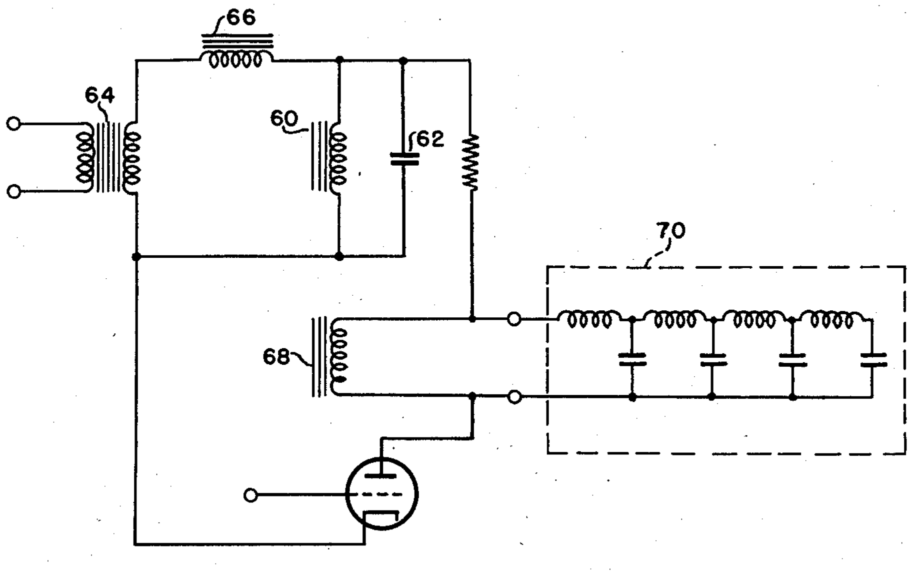
Fig. 5 is a circuit diagram of an embodiment using an alternating current power source instead of a direct current source.

To overcome the de-ionization difficulty an alternating potential is used for the high voltage source. The circuit diagram of the system is shown in Fig. 5.

The inductance 60 and the condenser 62 form a parallel circuit which is resonant to a frequency equal to the pulse repetition rate. The tuned circuit is excited by a transformer 64. The choke 66 is necessary to isolate the transformer from the tuned circuit, so that the oscillating current does not flow through the high voltage transformer.

The inductance 68, is shunted across the line 70 to accomplish the reversal of line change. The voltage between the two ends of the winding is very high during certain parts of the cycle, so it is necessary to immerse the choke in transformer oil to prevent sparking between the adjacent layers of the winding.

Equality of output to input voltage, which is obtained also in this circuit, is a unique advantage of open line potential reversing systems in accordance with this invention.

Using a line composed of uniform sections the top of the pulse is slanted down due to the fact that the capacity in the tuned LC circuit composed of condenser 62 and inductor 60 is low in comparison to the total capacity in the artificial line 70. This causes the voltage supplied by the resonant circuit to drop a certain amount during the time current is being drawn from the resonant circuit for the pulse.

The top of the pulse can be flattened in several ways. First the capacity 62 can be increased and the inductance 60 decreased so that more current is available from the resonant circuit and is probably the most deisrable method.

Another method of flattening the pulse top is to use a modified artificial line in which the various sections comprising the line are not uniform. The trailing edge of the pulse can be made shorter by using more sections on the line.

What is claimed is:

1. A pulse generator comprising, an open-ended transmission line, a load impedance substantially equal to the characteristic impedance of said line connected in series therewith, a switch tube connected in series with said line and said load for permitting discharge of said line in respective short pulses, a direct current potential source with a condenser across its output, connected in series with said line, said load and said switch tube, and a triggered switch tube and an inductor in series connected across said line for reversing the polarity of charge on said line between pulses, whereby a voltage is produced around said circuit double in amplitude that of said source and whereby also a pulse is produced across said load equal in voltage to said source.

2. A pulse generator comprising an open-ended transmission line connected in series with a source of potential, a load having an impedance substantially equal to the characteristic impedance in said line and a first switch tube, means for periodically rendering said first switch tube conductive, whereby said transmission line is charged to the potential of said source and a pulse appears across said load, a second switch tube in series with a choke inductor connected to shunt said transmission line, means for periodically rendering said second switch tube conducting to connect said line and said inductor in an oscillatory circuit, thereby reversing the polarity of charge potential on said line.

3. A pulse generator comprising an open-ended transmission line connected in series with a source of potential, a load having an impedance substantially equal to the characteristic impedance in said line and a first thyratron tube, means for periodically rendering said first thyratron conductive whereby said transmission line is charged to the potential of said source, thereby terminating conduction of said first thyratron switch tube, and a pulse appears across said load, a second thyratron tube in series with a choke inductor and connected to shunt said transmission line, means for periodically rendering said second thyratron tube conducting during the time said first thyratron switch tube is nonconducting to connect said line and said inductor in an oscillatory circuit, thereby reversing the polarity of charge potential on said line and terminating conduction of said second thyratron.

4. A pulse generator comprising an open-ended transmission line connected in series with a source of potential, a load having an impedance substantially equal to the characteristic impedance in said line and a first thyratron switch tube, means for periodically rendering said first thyratron switch tube conductive whereby said transmission line is charged to the potential of said source, thereby terminating conduction of said first thyratron switch tube, a second thyratron switch tube and a choke inductor in series connection shunting said transmission line, means for periodically rendering said second thyratron switch tube conducting during the time said first thyratron switch tube is nonconducting to connect said line and said inductor in an oscillatory circuit, thereby reversing the polarity of charge potential on said line and terminating conduction of said second thyratron, whereby the reversed polarity of potential of said network is additive with the potential of said source to provide an output pulse across said load during conduction of said first thyratron switch tube.

5. A pulse generator having in combination a circuit comprising a source of potential, a load, a gas-filled electron tube and a pulse forming network having first and second terminals, said network being coupled in series with said source, said load and said electron tube, means periodically initiating conduction in said tube to charge said network to the potential and polarity of said source, thereby terminating conduction of said electron tube, a series circuit consisting of a second gas-filled electron tube and a line resonating inductor connected in shunt across said first and second terminals of said network, and means for periodically initiating conduction of said second tube during nonconduction of said first tube to connect said network and said inductor in an oscillatory circuit, the oscillating current thereof reversing the potential of charge of said network and terminating conduction of said second tube.

6. A pulse generator having in combination a circuit comprising a source of potential, a load, a thyratron switch tube and a pulse forming network having first and second terminals, said network being coupled in series with said source, said load and said thyratron tube, means periodically initiating conduction in said thyratron tube to charge said network to the potential and polarity of said source, thereby terminating conduction of said thyratron tube, a network polarity reversing circuit consisting of a second thyratron switch tube in series with a line resonating inductor connected in shunt across said first and second terminals of said network, and means for periodically initiating conduction of said second thyratron tube during nonconduction of said first thyratron tube to connect said network and said inductor in a resonant circuit, the oscillatory current thereof reversing the potential of charge of said network and terminating conduction of said second tube.

7. A pulse generator having in combination a circuit comprising a source of potential, a load, a gas-filled grid controlled electron tube and a pulse forming network having first and second terminals, said network being coupled in series with said source, said load and said electron tube, means periodically biasing the grid of said tube to initiate conduction therein to charge said network to the potential and polarity of said source, thereby generating a voltage pulse across said load and terminating conduction of said electron tube, a network polarity reversing circuit consisting of a second gas-filled grid controlled electron tube in series with a line resonating inductor connected in shunt across said first and second terminals of said network, and means for periodically biasing the grid of said second tube to initiate conduction of said second tube during nonconduction of said first tube thereby connecting said network and said inductor in a resonant circuit, the oscilaltory current thereof reversing the potential of charge of said network and terminating conduction of said second tube.

References Cited in the file of this patent

UNITED STATES PATENTS

| | | |
|---|---|---|
| 2,394,389 | Lord | Feb. 5, 1946 |
| 2,429,471 | Lord | Oct. 21, 1947 |
| 2,496,543 | Kanner | Feb. 7, 1950 |
| 2,511,595 | Loughren | June 13, 1950 |
| 2,603,752 | Winter | July 15, 1952 |